United States Patent

Petit et al.

[11] Patent Number: 5,447,705
[45] Date of Patent: Sep. 5, 1995

[54] OXIDATION CATALYST AND PROCESS FOR THE PARTIAL OXIDATION OF METHANE

[75] Inventors: Corinne Petit, Strasbourg; Alain Kiennemann, Illkirch; Patrick Chaumette, Bougival; Olivier Clause, Chatou, all of France

[73] Assignee: Institut Francais du Petrole, Rueil Malmaison, France

[21] Appl. No.: 127,616

[22] Filed: Sep. 28, 1993

[30] Foreign Application Priority Data

Sep. 28, 1992 [FR] France .................. 92 11638

[51] Int. Cl.⁶ .................. C01B 31/18; C01B 3/26
[52] U.S. Cl. .................. 423/418.2; 423/651; 502/303; 502/304; 502/337; 502/338; 502/525
[58] Field of Search ........... 502/303, 337, 338, 525, 502/300, 304, 306, 313, 308, 309, 314, 325, 340, 349, 350, 353; 423/651

[56] References Cited

U.S. PATENT DOCUMENTS

| | | | |
|---|---|---|---|
| 4,110,254 | 8/1978 | Lauder | 502/525 |
| 4,812,300 | 3/1989 | Quinlan et al. | 423/404 |
| 5,093,301 | 3/1992 | Chu et al. | 502/303 |
| 5,149,516 | 9/1992 | Han et al. | 423/418.2 |
| 5,185,311 | 2/1993 | Tabata et al. | 502/528 |

FOREIGN PATENT DOCUMENTS

| | | |
|---|---|---|
| 0084273 | 7/1983 | European Pat. Off. |
| 0089199 | 9/1983 | European Pat. Off. |
| 0468127 | 1/1992 | European Pat. Off. |
| 2239406 | 7/1991 | United Kingdom |

*Primary Examiner*—Anthony McFarlane
*Attorney, Agent, or Firm*—Millen, White, Zelano & Branigan

[57] ABSTRACT

The invention relates to a catalyst for the partial oxidation of methane or a gaseous mixture containing methane, said catalyst which preferably has a perovskite structure has the following composition:

$$Ln_xA_{1-y}B_yO_3$$

in which x is a number such that $0<x<10$, y is a number such that $0<y<1$, Ln is at least one element chosen from within the group formed by rare earths, strontium and bismuth and A and B are metals of groups IV b, V b, VI b and VIII of the periodic classification of elements.

12 Claims, No Drawings

OXIDATION CATALYST AND PROCESS FOR THE PARTIAL OXIDATION OF METHANE

BACKGROUND OF THE INVENTION

The present invention relates to a process for the production of hydrogen or $CO-(CO_2)-H_2$ mixtures, i.e. $CO-H_2$ mixtures optionally incorporated $CO_2$, but mainly carbon monoxide and hydrogen and known as synthesis gases, from methane or a gaseous mixture containing methane such as natural gas or gas combined with oil.

Synthesis gas is conventionally produced from natural gas either by steam reforming at a temperature of approximately 900° C. and under a pressure between 20 and 30 bar, in the presence of a nickel-based catalyst, or by partial oxidation with oxygen at high temperature ($>1200$° C.) and under pressure (20 to 30 bar) in specific burners.

EP 303 438 describes a process for the partial oxidation of hydrocarbons into hydrogen and carbon oxides. This process uses steam in addition to oxygen and takes place at high temperature, i.e. at between 870 and 1040° C. and under a pressure of 2 to 3 MPa. However, the mixture formed essentially contains hydrogen and carbon dioxide and is carbon monoxide-depleted. Moreover, the CO selectivity decreases when the partial water pressure and/or temperature are lowered.

Recently Green et al (Catalysis Today 13, 417, 1992; GB 2 239 406) have demonstrated that it is possible to catalyse the partial oxidation reaction of methane by means of transition metals such as Ni, Ru, Rh, Pd, Pt and Ir supported on inert oxides. At low temperature, i.e. between 380° and 780° C. and a pressure between 1 and 20 bar, high synthesis gas yields have been obtained in this way. Among the catalysts studied by the above authors $Eu_2Ir_2O_7$ and $Pr_2Ru_2O_7$ formulations lead to the highest activities. However, these activities decrease significantly with low contact times (W. J. M. Vermeiren et coll., Catalysis Today, 13, 442, 1992). Moroever, the mixed oxide structure of the pyrochlore type of these formulations, revealed before the catalytic test, is destroyed during the test so as to lead to metallic particles dispersed on oxide of rare earths which constitute the active site in the conversion reaction of methane (or natural gas) into synthesis gas (Ashcroft et coll., Catalysis Letters 8, 169, 1991).

SUMMARY OF THE INVENTION

The discovery has now been made of a catalytic composition which is stable at low temperature under a reaction medium and which leads to a high yield of hydrogen or synthesis gas $CO-(CO_2)-H_2$, mainly containing carbon monoxide and hydrogen, during the partial oxidation of methane or a gaseous mixture containing methane, such as natural gas or gas combined with oil. Said partial oxidation is performed by means of at least one oxidizing agent chosen from within the group constituted by oxygen, air and carbon dioxide, said oxidizing agent optionally having nitrogen added to it, under relatively gentle conditions.

The catalyst according to the invention has the composition $Ln_xA_{1-y}B_yO_3$, in which $0<x<10$ and $0<y<1$ and which preferably has a perovskite-type crystalline structure and which is preferably stable under a reaction medium, where Ln is at least one element chosen from within the group formed by rare earths having an atomic number between 57 and 71 inclusive, strontium and bismuth, i.e. at least one element chosen from among elements of group IIIb such as La, Ce, Pr, Nd, Pm, Sm, Eu, Gd, Tb, Dy, Ho, Er, Tm, Yb, Lu, strontium and bismuth and in preferred manner among the following elements: La, Ce, Pr, Nd, Sm, Eu, Dy, Ho and Er and in a preferred manner among the following elements: La, Ce, Pr, Nd, Sm and where A and B, which are different from one another, are metals chosen from among groups IVb, Vb, VIb, VIIb and VIII, i.e. the group formed by the elements Ti, Zr, Hf, V, Ni, Ta, Ho, Cr, Mo, W, Mn, Te, Re, Fe, Os, Rh, Ir, Ni, Pd and Pt, preferably in groups IVb, VIb and VIII, such as the elements chosen in the group formed by Ti, Zr, Hf, Cr, Mo, W, Fe, Ru, Os, Co, Rh, Ir, Ni, Pd and Pt and preferably among the elements Ti, Cr, Fe, Ru, Co, Rh and Ni and more preferably among the elements Fe, Co and Ni, and even more preferably among the elements Fe and Ni. Optionally, Ln represents several different elements and preferably Ln represents at the most three different elements. A preferred composition according to the invention is $La_xFe_{1-y}Ni_yO_3$, in which x is a number such that $0<x<10$ and y is a number such that $0<y<1$.

X-ray diffraction can be used for characterizing the perovskite phases. The X-ray diffraction diagrams of each sample are e.g. recorded on a Siemens D500 goniometer using the $K\alpha_1$ line of cobalt. Studying the X-ray diffraction diagrams reveals the characteristic lines of perovskite phases, as a function of the composition of the catalyst.

The catalyst according to the invention can be prepared by any known method such as coprecipitation, impregnation, a sol-gel method, or mechanically mixing oxides or precursors of oxides of the different elements, followed by a calcination. Preferred preparation methods for the catalyst are in particular those described in patent applications GB-A-1 282 307 and FR-90/16212.

Another preferred catalyst preparation method consists of preparing an aqueous solution S containing soluble compounds of the various elements Ln and/or A and/or B in proportions corresponding to those of the desired formulation. The compounds which it is possible to use in this preparation method are e.g. chosen from within the group constituted by halides, nitrates, acetates, sulphates and any other inorganic or metalorganic derivative containing these elements.

To the solution S is then added a solution T containing a complexing acid dissolved in water in slight excess compared with the quantity adequate for complexing all the elements Ln, A and B and for making them precipitate. The acids usable in this preparation method are complexing acids such as citric, tartaric or oxalic acid.

The residual solvent is then either separated by filtration, or evaporated to dryness and the collected precipitate is dried at a temperature between 20° and 200° C. and then calcined, e.g. under an air or nitrogen flow, to a temperature between 200° and 900° C.

The catalyst according to the invention can optionally be shaped by any known process, e.g. by extrusion, drop coagulation, drageification, pelletizing or spray drying. After the shaping stage, the catalyst optionally undergoes a final thermal activation (optional drying and then calcination) under the aforementioned operating conditions.

The catalyst prepared according to the operating procedures of the invention described hereinbefore is particularly suitable for use in processes for the production of at least one gas chosen from within the group formed by hydrogen and $CO—(CO_2)—H_2$ mixtures mainly containing carbon monoxide and hydrogen, by partial oxidation by at least one element chosen from within the group formed by oxygen, air and carbon dioxide. To the said element is optionally added nitrogen, methane or a gaseous mixture containing methane, such as natural gas or gas combined with oil, under relatively gentle conditions.

Thus, the present invention also relates to a process for the preparation of synthesis gases from methane or gaseous mixtures containing methane in the presence of a catalyst prepared according to the invention.

The catalyst for producing the synthesis gas is normally used under the following conditions. The catalyst is introduced into a reactor, contacted with the reactive gas and then the ambient temperature is slowly raised to the reaction temperature, i.e. at a heating rate between e.g. 0.1° and 3° C. per minute and preferably between 0.5° and 1° C. per minute.

The reactive gas is constituted by a mixture of methane or gas containing methane and oxygen and/or air and/or $CO_2$ to which nitrogen is optionally added. The $CH_4$: $(O_2+CO_2)$ ratio preferably exceeds 0.5 and more particularly is equal to or higher than 1. The conversion of said reactive gas into synthesis gas takes place under a total pressure normally between 0.1 and 5 MPa and preferably between 0.1 and 1 MPa. The temperature being low, i.e. generally between 300° and 1000° C., preferably between 500° and 900° C. and even more preferably between 500° and 800° C.

The space velocity is normally between $10^3$ and $2.10^5$ volumes of reactive gas per catalyst volume and per hour and is preferably between $5.10^3$ and $5.10^4$ volumes of reactive gas per catalyst volume and per hour.

The catalyst according to the invention is particularly active and stable at low temperature in the partial oxidation reaction of methane or a gaseous mixture containing methane for producing hydrogen or synthesis gas.

EXAMPLES

The following examples illustrate the invention without limiting its scope.

Example 1

Catalyst A $La_1Ni_{0.2}Fe_{0.8}O_3$

A solution S is prepared by dissolving 93.5 g of lanthanum nitrate hexahydrate, 12.5 g of nickel nitrate hexahydrate and 60.5 g of iron nitrate hexahydrate in 200 ml of water. A solution T is prepared separately by dissolving 92 g of oxalic acid. The addition of solution T to solution S at 25° C. and accompanied by stirring leads to the formation of a mixed oxalate precipitate of lanthanum, iron and nickel.

Following slow evaporation of the residual solvent, a yellow powder is obtained, which is dried for 16 hours at 120° C. and then calcined to 800° C. at a temperature rise rate of 3° C./min. and spends 4 hours at 800° C. After calcination 50 g of catalyst A with the perovskite structure are obtained.

Example 2

Catalyst B $La_1Ni_{0.5}Fe_{0.5}O_3$

The preparation of catalyst C differs from that of catalyst A in that the quantities of nickel nitrate hexahydrate and iron nitrate hexahydrate used are respectively 31.4 g and 37.8 g. At the end of the calcination process 50 g of catalyst B are obtained and the catalyst has the perovskite structure.

Example 3

Catalyst C $La_1Ni_{0.6}Fe_{0.4}O_3$

The preparation of catalyst C differs from that of catalyst A in that the quantities of nickel nitrate hexahydrate and iron nitrate hexahydrate used are respectively 37.7 g and 30.2 g. The catalyst C obtained has the perovskite structure.

Example 4

Catalyst D $La_1Ni_{0.8}Fe_{0.2}O_3$

The preparation of catalyst D differs from that of catalyst A in that the quantities of nickel nitrate hexahydrate and iron nitrate hexahydrate used are respectively 50.2 g and 15.1 g. The catalyst D obtained has the perovskite structure.

Example 5 (comparative)

Catalyst E $La_1Ni_1O_3$

The preparation of catalyst E differs from that of catalyst A in that the nickel nitrate hexahydrate quantity is 62.8 g and no iron is introduced in the preparation of the catalyst. The catalyst E obtained has the perovskite structure.

Example 6 (comparative)

Catalyst F $La_1Fe_1O_3$

The preparation of catalyst F differs from that of catalyst A in that the iron nitrate hexahydrate quantity used is 75.6 g and no nickel is introduced in the preparation of the catalyst. The catalyst F obtained has the perovskite structure.

Example 7

Catalysts A to F, whose preparation is described in Examples 1 to 6, are tested in the gaseous phase in a unit operating on 50 cm$^3$ of catalyst. The catalyst bed is placed between two quartz particle beds. The catalysts A to F are contacted with a mixture of methane, oxygen and nitrogen having the following composition (in partial pressure terms):

$CH_4$: 13.30 kPa
$O_2$: 6.65 kPa
$N_2$: 80.00 kPa

The space velocity is $15.10^3$ volumes of reactive gases per volume of catalyst and per hour. The temperature of the catalyst bed is raised from ambient temperature to the test temperature indicated in table 1 at a rate of 1° C. per minute. The performance characteristics obtained after different reaction times are given in table 1.

The methane conversion is calculated according to the following formula:

$$\text{conversion} = \frac{\text{moles of } CH_4 \text{ transformed}}{\text{initial moles of } CH_4} \times 100$$

The CO, $CO_2$ selectivities are calculated on the basis of the expression:

$$\text{Selectivity } CO(CO_2) = \frac{\text{moles of } CO(CO_2)}{\text{moles of } CH_4 \text{ transformed}} \times 100$$

The results given in table 1 show that catalysts A to D according to the invention are active and selective at low temperature in the partial oxidation reaction of methane or a gaseous mixture containing methane for producing hydrogen or synthesis gas.

In particular, these catalysts which simultaneously contain nickel and iron in combined form in the perovskite structure are both more active and more stable at low temperature than the comparative catalysts containing either only nickel (catalyst E) or only iron (catalyst F). The catalysts according to the invention also lead to the formation of CO in a higher proportion than in the case of the comparative catalysts E and F, the carbon monoxide being formed in majority form compared with $CO_2$ as soon as the reaction temperature exceeds 700° C.

The stability of the catalysts according to the invention is due to the stability of the perovskite structure, including under reaction gas, as is shown by the X-ray diffraction spectra, e.g. for catalyst B before the test and after 1000 hours of testing respectively.

However, the perovskite structure of catalyst E (La Ni $O_3$, comparative catalyst) observed by X-ray diffraction before the test is not maintained after only 2 hours testing at 800° C. The diffraction spectrum then indicates the presence of metallic nickel and a lanthanum oxycarbonate phase.

A is a metal of groups IVb, Vb, VIb, VIIb or VIII of the periodic classification of elements, B is a metal of groups IVb, Vb, VIb, VIIb or VIII of the periodic classification of elements, and A and B are two different metals.

2. A catalyst according to claim 1, wherein Ln is at least one of La, Ce, Pr, Nd, Sm, En, Dy, Ho or Ef, A is Ti, Cr, Fe, Ru, Co, Rh or Ni and B is Ti, Cr, Fe, Ru, Co, Rh or Ni.

3. A catalyst according to claim 1, wherein A is Fe, Co or Ni and B is Fe, Co or Ni.

4. A catalyst according to claim 1, having the composition $La_xFe_{1-y}Ni_yO_3$, in which x is a number such that $0<x<10$ and y is a number such that $0<y<1$.

5. A catalyst according to claim 1, which is prepared by a process comprising calcining at 200°–900° C.

6. A catalyst according to claim 1, prepared by a process comprising:
preparing an aqueous solution S containing soluble compounds of Ln and/or A and/or B in proportions corresponding to those of a desired formulation,
adding a solution T containing a complexing acid, to produce a precipitate containing Ln, A and B,
separating residual solvent,
drying the precipitate, and
calcining at a temperature of between 200° C. and 900° C.

| Catalyst | Temperature (°C.) | Test duration (h) | $CH_4$ Conversion (%) | Selectivities (%) CO | $CO_2$ | $H_2/CO$* |
|---|---|---|---|---|---|---|
| A | 600 | 100 | 24.9 | 0 | 100 | — |
|  | 700 | 100 | 33.8 | 52.5 | 47.5 | 2.3 |
|  | 800 | 100 | 46.7 | 57.3 | 42.7 | 2.3 |
|  | 800 | 1000 | 46.1 | 57.0 | 43.0 | 2.2 |
| B | 600 | 100 | 25.0 | 0 | 100 | — |
|  | 700 | 100 | 67.1 | 76.8 | 23.2 | 2.5 |
|  | 800 | 100 | 97.0 | 97.0 | 3.0 | 2.14 |
|  | 800 | 1000 | 96.6 | 96.5 | 3.5 | 2.14 |
| C | 600 | 100 | 24.9 | 0 | 100 | — |
|  | 700 | 100 | 66.1 | 79.3 | 20.7 | 2.3 |
|  | 800 | 100 | 97.0 | 98.7 | 1.3 | 2.14 |
|  | 800 | 1000 | 96.8 | 98.8 | 1.2 | 2.14 |
| D | 600 | 100 | 24.5 | 0 | 100 | — |
|  | 700 | 100 | 59.6 | 25.7 | 74.3 | 2.5 |
|  | 800 | 100 | 96.3 | 99.1 | 0.9 | 2.15 |
|  | 800 | 1000 | 95.8 | 99.0 | 1.0 | 2.15 |
| E (comparative) | 600 | 100 | 25.2 | 0 | 100 | — |
|  | 700 | 100 | 25.1 | 0 | 100 | — |
|  | 800 | 100 | 29.4 | 16.4 | 83.6 | 2.5 |
|  | 800 | 1000 | 17.2 | 14.8 | 85.2 | 2.5 |
| F (comparative) | 600 | 100 | 25.6 | 0 | 100 | — |
|  | 700 | 100 | 23.8 | 0 | 100 | — |
|  | 800 | 100 | 25.3 | 8.4 | 91.6 | 2.5 |
|  | 800 | 1000 | 21.4 | 7.6 | 92.4 | 2.5 |

* $\frac{\text{moles } H_2}{\text{moles CO}}$ on leaving the reactor

We claim:

1. A catalyst for the partial oxidation of methane or a gaseous mixture containing methane, said catalyst having a perovskite crystalline structure and having the following composition:

$$Ln_xA_{1-y}B_yO_3$$

in which
x is a number such that $0<x<10$
y is a number such that $0<y<1$
Ln is at least one of a rare earth, strontium or bismuth, 7. A catalyst prepared according to claim 6, wherein the complexing acid is dissolved in water in excess compared with the quantity adequate for complexing all of Ln, A, and B and for making Ln, A and B precipitate; the solvent is separated by filtration or evaporation to dryness; and the precipitate is dried at 20°–200° C.

8. A process for the production by partial oxidation with oxygen, air or carbon dioxide, of methane or a gaseous mixture containing methane of at least one of hydrogen gas or a CO—($CO_2$)—$H_2$ gas mixture, mainly containing CO and $H_2$, said process comprising subjecting said methane or mixture containing methane to oxidation conditions in the presence of a catalyst having a perovskite crystalline structure and having the following composition:

$$Ln_xA_{1-y}B_yO_3$$

in which
- x is a number such that $0 < x < 10$
- y is a number such that $9 < y < 1$
- Ln is at least one of a rare earth, strontium or bismuth,
- A is a metal of groups IVb, Vb, VIb, VIIb or VIII of the periodic classification of elements,
- B is a metal of groups IVb, Vb, VIb, VIIb or VIII of the periodic classification of elements, and
- A and B are two different metals.

9. A process according to claim 8 wherein said process is conducted at a ratio $CH_4:(O_2+CO_2)$ equal to or higher than 0.5.

10. A process according to claim 8 wherein said process is conducted at a ratio $CH_4:(O_2+CO_2)$ equal to or higher than 1.

11. A process according to claim 8 wherein said process is conducted at a temperature between 500° and 800° C.

12. A process according to claim 8, wherein said process conducted under the following operating conditions:
- a total pressure between 0.1 and 5 MPa,
- a temperature between 300° and 1000° C., and
- a space velocity between $10^3$ and $2.10^5$ volumes of gas per volume of catalyst and per hour.

* * * * *